Patented Jan. 19, 1937

2,067,985

UNITED STATES PATENT OFFICE 2,067,985

TREATMENT OF WASTE SULPHURIC ACID AND MANUFACTURE OF SULPHATE AND CARBONACEOUS COMPOSITIONS THEREFROM

Neil A. Sargent, Woburn, Mass., assignor, by mesne assignments, to Monsanto Chemical Company, a corporation of Delaware No Drawing. Application May 10, 1933, Serial No. 670,306

13 Claims. (Cl. 252—3)

This invention relates to a process of treating sulphuric acid containing soluble organic matter, in such a way as to convert this soluble material into a form of active, absorptive, decolorizing or deodorizing carbon which suffices to remove completely any residual organic matter from solutions of metallic sulphates produced when the treated acid is allowed to react with metals, metallic oxides, alkalies or salts in the form of minerals, ores, metallurgical products or chemical preparations;—or by further modification to the production of substantially pure sulphuric acid and decolorizing carbon.

One object of the invention is to provide a method of treating waste sulphuric acid that is contaminated with organic matter particularly that of a petroleum origin which will render the acid suitable for the manufacture of salts of sulphuric acid, fertilizer products, etc. which are free of the characteristic objectionable odors of the raw acid.

The invention likewise contemplates a method of manufacturing commercial grades of sulphuric acid salts from inferior grades of acid having organic impurities present therein.

A further object of the invention resides in the provision of a surrogate for products such as carbon black, bone char and the like for use in the pigment, rubber, and allied arts and in the provision of a use for carbonaceous materials present in acid sludge.

It is common knowledge that sulphuric acid containing soluble organic matter of varying amount is produced in industries of varying nature. The refining of petroleum involves the use of sulphuric acid of varying strengths as a purifying agent. The undesirable impurities probably react chemically with the sulphuric acid forming sulfones, sulfonic acids, alkyl sulfates, and varied organic sulfur compounds, all of which go in solution in the sulphuric acid and are separated from the purified organic oil by usual methods applied in the art. The art of producing organic compounds, as alcohols, ethers, and derived products, by hydrolysis of alkyl sulfates, yields sulphuric acid of low concentration containing soluble organic matter of varying amount, depending more or less on the olefin materials used in compounding the alkyl sulfate, and the type of process utilized in the compounding and subsequent hydrolysis. For example, the production of alcohols, ethers and derived products from olefins is a commercial process involving the absorption of olefins in sulphuric acid of suitable strength under suitable condition forming monoalkyl or dialkyl esters. These, on subsequent hydrolysis, under prescribed conditions, yield the desired organic compound, and a highly colored or black sulphuric acid containing varying amounts of soluble organic matter.

It is commonly known that the sulphuric acid obtained as a by-product in the process of purifying and refining petroleum oils, gasolines, lubricating oil and oil products, designated as sludge acid, oil sludge acid, or acid sludge may be treated in various ways,—by dilution and boiling, steaming or distillation, so that a portion of the combined sulfonic acids, or sulfate hydrocarbon esters are hydrolyzed more or less completely forming tarry, insoluble hydrocarbons which may be separated from the heavier diluted acid by usual gravity methods. This produces a weak, sulphuric acid, commonly designated as separated sludge acid, which is still highly colored and contains sufficient dissolved organic matter to render it unfit for use for most purposes for which sulphuric acid is commonly used.

Several processes for treating strong, unseparated sludge acid have been recognized in the arts, involving heating mixtures of sludge acid or acid sludge and water under varying pressures, acid strengths, and temperatures, aiming to carry out the hydrolysis described above to a further degree than is possible under the normal atmospheric pressure dilution or steaming processes. Other processes of treating weaker or separated acids are carried out, combining pressure cooking with or without addition of solvents in an attempt to produce light hydrocarbon oils, fuel oils, or carbonaceous material, and the recovery of clean sulphuric acid. These methods improve the acid, comparative to the well known steaming and dilution methods, so that it may be used for purposes where color, odor and residual organic matter are of secondary importance. However, none of the methods produce acid of suitable quality to be used in the manufacture of commercial sulfates of aluminum, ammonium, ferrous and ferric iron magnesium, potassium, sodium or others, or for various other technical uses of sulphuric acid where absence of color, traces of odor, and any soluble organic matter are specified.

The present invention fulfills these requirements and is based on the discovery that if the weak separated sludge acid is concentrated to an acid strength of approximately 68–72% $H_2SO_4$, or stronger, a decreased solubility of complex organic sulfur compounds results, and these would be thrown out of solution as a tarry oil which solidifies to a plastic-like mass on cooling. However, if now this mixture of acid and tarry mass is heated in an autoclave or suitable pressure cooking device, for a period of one to two hours, at 175–180° C. or higher which is equivalent to 5°–10° C. above the atmospheric boiling point of the acid obtained, by maintaining a definite pressure, the plastic-like mass of complex organic sulfur compounds is converted to a very finely divided, absorptive carbon, readily filterable, and showing high decolorizing and deodorizing properties.

I have further discovered that if the concentration of the separated sludge acid is carried to approximately 70% $H_2SO_4$ or stronger, and the acid is autoclaved under the conditions as described, that the removal of soluble organic matter may be incomplete, and that the acid, from which the fine carbon produced by autoclaving has been removed by filtration, still is somewhat colored and may contain too much soluble organic matter to render it suitable for use in the manufacture of commercial sulfate products. If however, the mixture of acid and fine carbon produced by the decomposition of the plastic-like tarry complex in the autoclaving process is used directly in the processes of manufacturing sulfates, there is present sufficient adsorptive, decolorizing, and deodorizing carbon to eliminate any residual soluble organic matter from the solutions of neutral or basic sulfates. After separation of the carbon from the solutions, they may be concentrated or crystallized to the solid commercial products by the usual methods known to the art. The products, thus produced, are free of organic matter, extraneous color and odor, and comply with the specifications demanded by the trade.

The pressure boiling or autoclaving of the sulphuric acid containing the soluble organic matter and plastic-like mass obtained by concentrating separated sludge acid probably performs two functions of (1) the conversion of the plastic-like tarry mass to carbon, and (2) further separation of and reduction of the content of the soluble organic matter in the concentrated acid, either by reaction with $H_2SO_4$ in the liquid phase, or by elimination as an insoluble organic sulfur complex which is immediately converted to carbon.

The absorption of olefines, pure, or mixed with other gaseous materials in sulphuric acid produces mixtures of alkyl and dialkyl sulfates in various amounts. When these are hydrolyzed and the alkyl alcohol, ether, or other derived products are distilled from the acid, the residual acid is very similar in quality and appearance to separated sludge acid, in being highly colored, and having a varying content of soluble organic matter, both inherent qualities which limit its subsequent utilization. I have discovered that this same method of concentrating this residual, or "stripped" acid to approximately 70% $H_2SO_4$ strength or stronger, followed by autoclaving or pressure boiling, as described above for separated sludge acid, will likewise produce carbon to decolorize and remove the residual soluble organic matter from solutions of neutral or basic sulfates when the acid-carbon mixture discharged from the autoclave is utilized for manufacturing commercial sulfate products commonly known to the trade; and that the type of reactions taking place is in general the same as described above for separated sludge acid. In the case of acid derived from these sources, the carbon may be formed from side reaction and polymerization products produced in the process of absorbing the olefins in sulphuric acid, as well as from foreign materials in the gas mixture used;—particularly so if the olefin gases are obtained from pyrolysis reactions. These contaminating materials are either high boiling compounds that do not volatilize as the hydrolyzed alkyl sulfate mixture is distilled, or compounds which do not undergo the hydrolysis reaction common to the alkyl sulfate, and would therefore remain in the acid as contaminating soluble organic matter unless this process of converting them partially or completely to a decolorizing carbon was applied.

The carbon produced from either petroleum sludge acid or olefin sludge acid has been found to have marked decolorizing and deodorizing properties. It is sufficiently finely divided to permit of its use as a commercial filler, or filling material; pigment substance, or any general use to which finely divided carbon produced from other sources is applied. Obviously the amount of carbon produced is dependent on the amount of soluble organic matter originally present in the sulphuric acid and this may be varied by well known methods, as, for example, by varying conditions of separating oils from sludge acid so that a larger amount of unhydrolyzed sulfonic acids or complex organic compounds shall remain in the separated acid;—or by varying conditions in the process of absorbing olefins in sulphuric acid, increased or decreased amounts of sulfonated olefins and polymerized products may be formed thus yielding varying amounts of carbon.

My process, then, consists of treating sulphuric acid containing soluble organic matter, by concentrating to a strength of 68%–72% $H_2SO_4$ (preferably about 70%) in suitable apparatus by usual well known methods, then heating the concentrated mixture of acid and plastic-tar like carbonaceous matter thus produced to a temperature of 175°–180° C. or higher for a period of time of .25–2 hours, in a suitable autoclave or pressure cooking device, so constructed that the gaseous decomposition products may be vented continuously, at intervals, or, not at all. The acid-carbon mixture may then be utilized to produce satisfactory commercial sulfate products by allowing the acid mixture to react with metals, metallic oxides, or hydroxides, or by double decomposition processes with salts by any of the well known methods or processes. Or the acid may be filtered through sand filters, porous plate filters or other filtering devices, and the carbon separated, and recovered as a commercial product. In many cases a greater amount of absorptive carbon may be produced than is necessary to completely decolorize, deodorize, or remove soluble organic matters from the finished sulfate material. Under these conditions the sulfate material would be compounded from filtered acid and the required amount of fine carbon would be added to the sulfate liquor to completely remove all soluble organic matter. The extra carbon thus recovered is, after washing with water and optionally neutralizing any acid adsorbed therein, a product of useful application in the various arts.

The following specific examples illustrate embodiments of my invention:

*Example I.*—Separated sludge acid, obtained as described for example in Canadian Patent No. 315,722 or other known methods for oil sludge acid, or sludge acid, at a strength of 40–54% $H_2SO_4$ is concentrated as by evaporation in evaporators or other apparatus of suitable design and construction, to an acid strength of 70% $H_2SO_4$ or stronger by the use of open fire, steam, or other heating methods. This concentrated acid is then transferred to an autoclave, or pressure heating device, and maintained at a temperature of 175°–180° C. for .25–2 hours. Sufficient pressure is maintained in the autoclave body to permit attaining this temperature of boiling acid. The pressure is controlled conveniently by venting the gases continuously or intermittently, although this removal is not necessary for obtaining desired results. The mixture of autoclaved acid and carbon is then transferred to a suitable container, tank, or mixer and there allowed to react with bauxite in the proper amount, by well known methods, to produce a reaction liquor comprising a basic solution of sulfate of alumina. This solution is separated from the bauxite residue and fine carbon by filtration, settling, or other well known means. The clear sulfate of alumina liquor is now boiled down by the usual method to finished alum, yielding a product of normal color, odor, and soluble organic content.

*Example II.*—Sulphuric acid, obtained from the process of hydrolyzing a mixture of mono and diethyl sulfate to produce ethyl alcohol or ether, is treated in an analogous way. By proper choice of the amount of water used in the hydrolysis and the method of distillation of the alcohols, acid of 70% strength can be obtained from the operation of stripping of the alcohol from the hydrolysis mixture. If conditions are so adjusted as to give weaker acid than 70% $H_2SO_4$ it should preferably be concentrated to this point. It is then autoclaved as provided in Example I, and the mixture of acid-carbon may be utilized for the manufacture of bauxite alum as therein described. Or the mixture may be filtered by using sand filters, porous plates, or suitable devices for filtration of sulphuric acid. The residuary carbon remaining as a cake on the filter is washed substantially free of sulphuric acid followed if desired by a weak alkaline wash and thereafter dried at 80° C., when it is ready for application as an absorption, decolorizing or deodorizing carbon, pigment, filler or other use to which finely divided carbon is applied.

*Example III.*—Certain types of waste sulphuric acid contain such a small amount of soluble organic matter that the quantity of active carbon produced in autoclaving is insufficient to satisfactorily purify the resulting sulfate solutions. In such cases sufficient acid, containing larger amounts of soluble organic matter may be blended with this acid; the mixture concentrated and autoclaved by the process as described, and a product obtained containing sufficient adsorptive carbon to give the desired sulfate product. Alternatively tarry matter, separated in the concentration of sulphuric acid having very high organic matter content, may be mixed with this acid prior to autoclaving. The autoclaving will convert this complex organic mass completely to carbon, thus providing sufficient carbon in the finished acid to make up the deficiency of carbon producing material in the original acid. Thus to 1000 pounds of waste sulphuric acid, containing less than 1% of soluble organic matter is added 50–100 pounds of solid tarry matter separated during the concentration of separated waste acid containing large quantities of soluble organic matter. This mixture is heated to 175°–180° C. for a period of .25–2 hours in an autoclave or other pressure cooking device, with or without venting of gaseous products formed. The acid-carbon mixture produced is suitable for the production of sulphate products by well known methods.

Although separated sludge acid and ethylene sludge acid have been given as examples of materials processed and bauxite alum as material produced in this invention, I am not to be limited to these materials alone. Any acid produced in hydrolysis of other alkyl sulfates other than monoethyl and diethyl sulphates, or other sulphuric acids containing soluble organic matter may be processed, and the processed acid may be used in the manufacture of other sulphates, commonly produced and known to the trade, as for example, sulfate of ammonia, copper, zinc, ferrous and ferric iron, sodium and potassium where the color, odor, and soluble organic matter would remain as contaminating materials in the finished product were it not for their removal by the absorptive carbon produced in processing the acid by this invention.

In as much as the characteristics of acid sludge vary widely with the nature of the petroleum product from which it is derived, the optimum conditions of my treatment so far as the extent of concentration, the degree of "superheat" imparted to the acid during the autoclaving operation and the time of reaction, etc., are concerned, may be varied to produce a product having the required properties. The most advantageous conditions of treatment are best established by actual tests under varying conditions. Moreover while I have described an evaporation of the separated acid at substantially atmospheric pressure one may, if desired, effect this step advantageously at reduced pressures.

From the foregoing it will be evident that by the present invention which contemplates the concentration of aqueous sulphuric acid containing organic impurities of a petroleum origin followed by an autoclave treatment whereby the organic matter is converted into an adsorptive carbon, I have provided a process which enables one to produce conveniently commercial grades of sulphate salts, or by filtering off the carbon, one may concentrate the acid further to produce an acid product which is of distinctly improved quality as compared to present day grades of recovered acid, and finally that I am enabled to produce a new carbon product which may be utilized advantageously in the arts as a surrogate for fillers, pigments or adsorptive agents.

What I claim is:—

1. The process of recovering sulfuric acid and of making carbon having adsorptive, decolorizing and deodorizing properties, from a dilute aqueous sulfuric acid containing soluble organic matter of a petroleum origin which comprises concentrating the acid to approximately 68%–72% $H_2SO_4$ strength and subsequently heating the same at superatmospheric pressure whereby active finely divided though filterable carbon is produced.

2. The process of making commercial sulfate products from sulfuric acid containing soluble organic matter, which consists in heating the acid, concentrated to 70% $H_2SO_4$ strength or stronger, at a temperature of 175° C.–180° C. or higher for .25 to 2 hours, to form adsorptive carbon and then allowing the carbon-acid mixture to react with metals, metallic oxides, hydroxides, or salts by double decomposition, by usual well known methods and then mechanically separating the carbon from the reaction liquor in which the sulphate products were formed.

3. The process of recovering sulfuric acid and of making carbon having adsorptive, decolorizing and deodorizing properties from separated sludge acid, which consists in concentrating the acid to a strength of approximately 70% H₂SO₄, heating the concentrated acid without appreciable further concentration and while maintaining the acid under positive pressure to a temperature of 175° C.–180° C. and subsequently separating the carbon thereby formed from the acid by filtration or other well known means.

4. The process of making adsorptive, decolorizing and deodorizing carbon from sulfuric acid obtained in the hydrolysis of alkyl sulfates, or mixtures of these produced by the absorption of olefines and olefine gas mixtures in sulfuric acid;— which consists in concentrating the acid while avoiding substantial carbonization of the organic impurities and subjecting the concentrated mixture under pressure substantially above normal atmospheric to a temperature substantially above the boiling point at atmospheric pressure to effect carbonization of the mixture until adsorptive carbon is formed.

5. The process of making commercial sulfate products from sulfuric acid obtained in the hydrolysis of alkyl sulfates or mixtures of these produced by the absorption of olefines and olefine gas mixtures in sulfuric acid;—which consists in heating the acid, concentrated to 70% H₂SO₄ strength or stronger, at a temperature of 175° C. or higher, for a period of .25 to 2 hours to form adsorptive carbon and then allowing the carbon-acid mixture to react with metals, metallic oxides, hydroxides, or salts by double decomposition by usual well known means.

6. The method which comprises concentrating relatively dilute aqueous sulfuric acid containing organic matter of a petroleum origin dissolved therein to approximately 70% H₂SO₄ strength and subsequently increasing the temperature above the atmospheric boiling temperature without substantially increasing the acid concentration of the mixture whereby the organic matter therein is carbonized.

7. The method as defined in claim 6 and further characterized in that the concentrated acid is heated at superatmospheric pressure the temperature is increased approximately 10° C. above the normal boiling temperature of the acid whereby a carbonization of the organic matter is effected.

8. The method of purifying aqueous sulfuric acid containing organic impurities of petroleum origin dissolved therein which comprises concentrating the aqueous acid while avoiding substantial carbonization and subsequently converting the impurities to an adsorptive form of carbon by raising the temperature of the concentrated mixture above the normal boiling temperature by the application of pressure thereto.

9. The method which comprises treating petroleum acid sludge with water and steam to effect decomposition of said sludge into a non-aqueous oily layer and a dilute aqueous sulphuric acid layer, separating the acid layer and concentrating the acid to approximately 70% H₂SO₄, heating the concentrated acid without appreciable further concentration and while maintaining the acid under positive pressure to a temperature of 175°–180° C. to form adsorptive carbon, and subsequently separating the carbon thereby formed from the acid by filtration or other well known means.

10. The method of purifying aqueous sulphuric sludge acid of at least 68% concentration from separation of mixed hydrocarbons containing organic impurities dissolved therein which comprises heating it in the presence of absorptive carbon to adsorb the impurities.

11. The method as defined in claim 10 in which the adsorptive carbon carrying the impurities is subsequently mechanically removed from the acid.

12. The method of making sulphate products from sulphuric sludge acid recovered from separation of mixed hydrocarbons, said acid containing dissolved organic impurities therein, which comprises treating the acid with absorptive carbon to absorb the impurities, reacting the acid in the presence of the carbon with a material from which sulphates are to be made, then mechanically removing the carbon from the reaction liquor.

13. The method of making pure water soluble mineral sulphates from aqueous sulphuric acid containing substantial amounts of organic impurities dissolved therein, which comprises admixing the acid with absorptive carbon to absorb the impurities, then reacting the resultant acid-carbon mixture with a mineral from which sulphates are to be formed and mechanically separating the carbon containing the impurities from the reaction liquor.

NEIL A. SARGENT.